US010452062B2

United States Patent
Smit et al.

(10) Patent No.: US 10,452,062 B2
(45) Date of Patent: Oct. 22, 2019

(54) PROGNOSTIC RULES FOR PREDICTING A PART FAILURE

(71) Applicant: GE Aviation Systems Limited, Cheltenham, Gloucestershire (GB)

(72) Inventors: Johan Arnold Smit, Eastleigh (GB); Paul Butterley, Eastleigh (GB)

(73) Assignee: GE Aviation Stystems Limited, Cheltenham, Gloucestershire (GB)

( * ) Notice: Subject to any disclaimer, the term of this patent is extended or adjusted under 35 U.S.C. 154(b) by 41 days.

(21) Appl. No.: 15/644,971

(22) Filed: Jul. 10, 2017

(65) Prior Publication Data

US 2018/0011481 A1     Jan. 11, 2018

(30) Foreign Application Priority Data

Jul. 11, 2016  (GB) .................................. 1611992.7

(51) Int. Cl.
    *G05B 23/02* (2006.01)
    *B64F 5/60* (2017.01)
    (Continued)

(52) U.S. Cl.
    CPC ......... *G05B 23/0283* (2013.01); *B64D 45/00* (2013.01); *B64F 5/60* (2017.01);
    (Continued)

(58) Field of Classification Search
    CPC .. G05B 23/0283; G07C 5/008; G07C 5/0808; B64F 5/60; B64D 45/00; B64D 2045/0085; G06Q 50/30; G06Q 10/20; G06Q 10/04
    See application file for complete search history.

(56) References Cited

U.S. PATENT DOCUMENTS

| 9,834,317 | B2 * | 12/2017 | Besseau | B64D 45/00 |
|---|---|---|---|---|
| 2010/0049379 | A1 * | 2/2010 | Vial | G07C 5/0808 |
| | | | | 701/3 |
| 2016/0257429 | A1 * | 9/2016 | Szeto | G07C 5/008 |

OTHER PUBLICATIONS

Sedighi et al., A Data Mining Based Algorithm to Enhance Maintenance Management: A Medical Equipment Case Study, 2011 First International Conference on Informatics and Computational Intelligence, Academia, 7 Pages. http://www.academia.edu/1441369/A_Data_Mining_Based_Algorithm_to_Enhance_Maintenance_Management_A_Medical_Equipment_Case_Study.

* cited by examiner

*Primary Examiner* — Kimberly S Berona
*Assistant Examiner* — Michael V Kerrigan
(74) *Attorney, Agent, or Firm* — Dority & Manning, P.A.

(57) ABSTRACT

A device may receive equipment information, associated with a first equipment, including information associated with anomalies identified based on operational information collected during operation of the first equipment, and messages generated during the operation of the first equipment. The device may receive maintenance information, associated with the first equipment, that identifies one or more part failures associated with one or more equipment parts. The device may identify associations between the one or more part failures and the first equipment information. The device may receive equipment information, associated with a second equipment, including information associated with anomalies identified based on operational information collected during operation of the second equipment, and messages generated during the operation of the second equipment. The device may generate and provide a prediction, associated with a future failure of an equipment part of the second equipment, based on the second equipment information and the associations.

20 Claims, 6 Drawing Sheets

(51) Int. Cl.
  *G07C 5/08*   (2006.01)
  *B64D 45/00*  (2006.01)
  *G07C 5/00*   (2006.01)
  *G06Q 10/04*      (2012.01)
  *G06Q 10/00*      (2012.01)
  *G06Q 50/30*      (2012.01)
(52) U.S. Cl.
  CPC ............ *G07C 5/008* (2013.01); *G07C 5/0808* (2013.01); *B64D 2045/0085* (2013.01); *G06Q 10/04* (2013.01); *G06Q 10/20* (2013.01); *G06Q 50/30* (2013.01)

PROGNOSTIC RULES FOR PREDICTING A PART FAILURE

BACKGROUND TO THE INVENTION

One or more types of data may be collected in association with an aircraft and/or operation of the aircraft, such as quick access recorder (QAR) data, engine monitoring unit (EMU) data, post flight report (PFR) data, maintenance, repair, and overhaul (MRO) data, environmental data (e.g., weather data, route data, airport data), or the like.

BRIEF DESCRIPTION OF THE INVENTION

According to some possible implementations, a method may include: receiving, by one or more devices, first equipment information associated with first equipment, where the first equipment information may include information associated with first anomalies identified based on first operational information collected during operation of the first equipment, and where the first equipment information may include information associated with first messages, associated with the operation of the first equipment, that are generated during the operation of the first equipment; receiving, by the one or more devices, first maintenance information, associated with the first equipment, that identifies one or more part failures associated with one or more equipment parts; identifying, by the one or more devices, associations between the one or more part failures and the first equipment information; receiving, by the one or more devices, second equipment information associated with second equipment, where the second equipment information may include information associated with second anomalies identified based on second operational information collected during operation of the second equipment, and where the second equipment information may include information associated with second messages, associated with the operation of the second equipment, that are generated during the operation of the second equipment; generating, by the one or more devices and based on the second equipment information and the associations, a prediction associated with a future failure of an equipment part of the second equipment; and providing, by the one or more devices, information associated with the prediction.

According to some possible implementations, a device may include one or more processors to: receive first equipment information associated with one or more first items of equipment, where the first equipment information may include information associated with anomalies identified based on operational information collected during operation of the one or more first items of equipment, and where the first equipment information may include information associated with messages, associated with the operation of the one or more first items of equipment, that are generated during the operation of the one or more first items of equipment; receive maintenance information, associated with the one or more first items of equipment, that identifies one or more part failures of one or more equipment parts of the one or more first items of equipment; identify associations between the one or more part failures and the first equipment information; and store information, regarding the associations between the one or more part failures and the first equipment information, to permit a prediction to be made regarding a future failure of an equipment part of a second item of equipment.

According to some possible implementations, a non-transitory computer-readable medium may store instructions that, when executed by one or more processors, cause the one or more processors to: receive first equipment information associated with first equipment, where the first equipment information may include information associated with first anomalies identified based on first operational information collected during operation of the first equipment, and where the first equipment information may include information associated with first messages, associated with the operation of the first equipment, that are generated during the operation of the first equipment; access associations identified based on information associated with one or more equipment part failures and second equipment information, where the one or more equipment part failures may be associated with second equipment and may be identified based on maintenance information associated with the second equipment, where the second equipment information may include information associated with second anomalies identified based on second operational information collected during operation of the second equipment, and where the second equipment information may include information associated with second messages, associated with the operation of the second equipment, that are generated during the operation of the second equipment; generate, based on the first equipment information and the associations, a prediction associated with a future failure of an equipment part of the first equipment; and provide information associated with the prediction.

DETAILED DESCRIPTION

The following detailed description of example implementations refers to the accompanying drawings. The same reference numbers in different drawings may identify the same or similar elements.

An aircraft is a complex device that can experience any number of failures and/or faults associated with of any number of parts and/or systems (herein collectively referred to as parts of an aircraft, and individually as a part of an aircraft). A considerable amount of information may be collected in association with the aircraft and/or operation of the aircraft, such as information associated with operation of the aircraft during one or more flights, during landing, during takeoff, during taxiing (herein referred to as operational information), information associated with part failures, maintenance, repair, upkeep, or the like, associated with the aircraft (herein referred to as maintenance information), and/or information associated with an environment in which the aircraft flies, operates, is based, or the like (herein referred to as environmental information). However, due the vast amount of available information and the number of different parts of an aircraft, identifying one or more items of these types of information that is useful for predicting a future part failure may be difficult, time consuming, and/or resource intensive.

Implementations described herein may provide a prognostic platform capable of generating one or more prognostic rules used to predict a future part failure associated with an aircraft. In some implementations, the prognostic platform may generate the prognostic rule based on analyzing operational information, maintenance information, and/or environmental information associated with multiple (e.g., hundreds, thousands) operations of multiple aircraft. In some implementations, the prognostic platform may use the prognostic rule to predict a future part failure associated with an aircraft.

Notably, while the techniques described herein are described in association with generating prognostic rules and predictions for failures of parts in the context of aircraft, these techniques may also be implemented other contexts. For example, these techniques may be implemented to generate prognostic rules and part failure predictions associated with a type of equipment (e.g., including one or more systems, devices, machines, or the like) other than an aircraft, such as another type of transportation equipment (e.g., a train, an automobile, a ship), industrial equipment, manufacturing equipment, mining equipment, oil and gas equipment, power equipment (e.g., associated with power generation, power transmission, and/or power distribution), an appliance, an engine, a turbine, or the like.

In these cases, the prognostic platform may identify one or more prognostic rules based on operational information associated with one or more items of equipment, maintenance information associated with the one or more items of equipment, and/or environmental information associated with the one or more items of equipment. The prognostic platform may then use the one or more prognostic rules to predict a future part failure associated with an item of equipment.

Figure 1A:
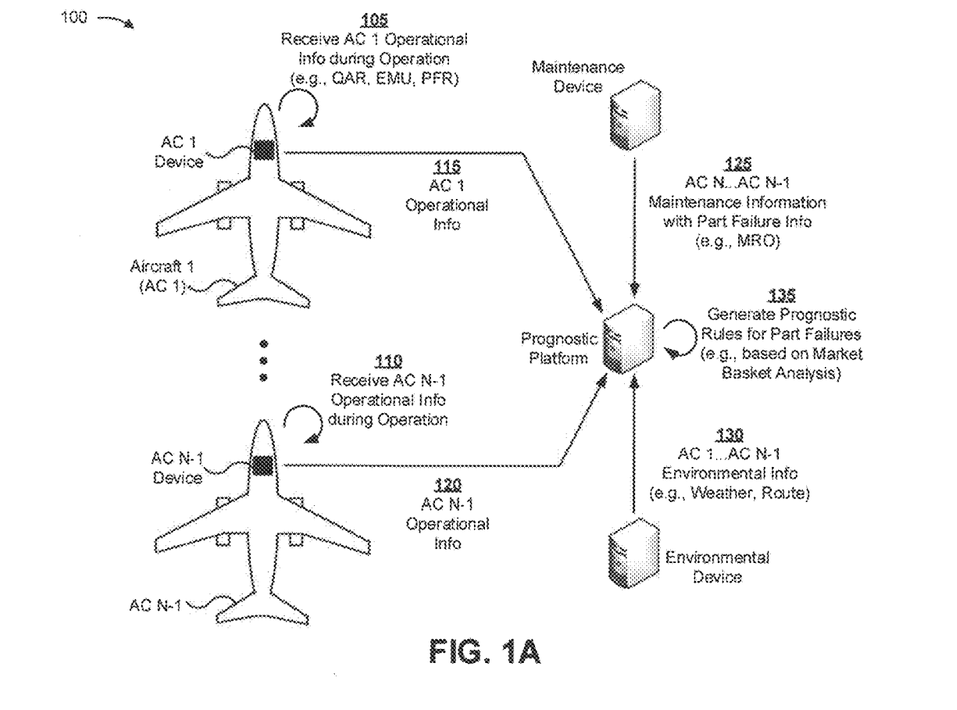
FIGS. 1A and 1B are diagrams of an overview of an example implementation described herein.
Figure 1B:
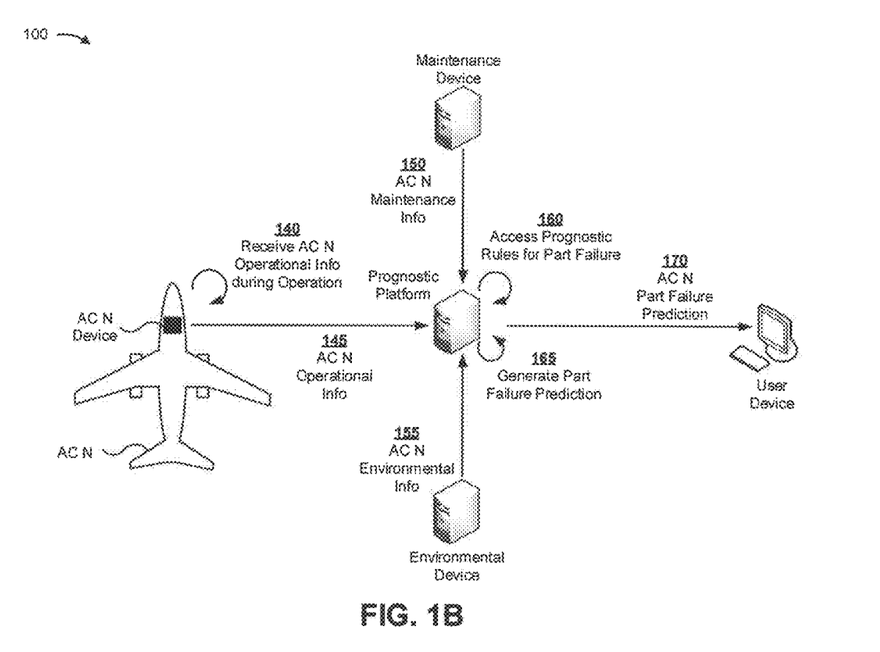

FIGS. 1A and 1B are diagrams of an overview of an example implementation 100 described herein. For the purposes of example implementation 100, assume that each aircraft in a set of aircraft (e.g., aircraft 1 through aircraft N-1) includes one or more aircraft devices capable of receiving (e.g., sensing, collecting, determining) operational information associated with operation of the set of aircraft.

As shown in FIG. 1A, and by reference number 105, aircraft device 1, associated with aircraft 1, may receive operational information associated with aircraft 1 during operation of aircraft 1. Similarly, as shown by reference number 110, aircraft device N-1, associated with aircraft N-1, may receive operational information associated with aircraft N-1 during operation of aircraft N-1. As shown by reference numbers 115 and 120, aircraft device 1 through aircraft N-1 may provide the aircraft 1 operational information and the aircraft N-1 operational information, respectively, to a prognostic platform.

As shown by reference number 125, the prognostic platform may also receive maintenance information associated with aircraft 1 through aircraft N-1. As shown by reference number 130, the prognostic platform may also receive environmental information associated with aircraft 1 through aircraft N-1 and/or operations of aircraft 1 through aircraft N-1.

As shown by reference number 135, the prognostic platform may generate one or more prognostic rules based on the information that identifies the one or more part failures and the operational information, the maintenance information, and/or the environmental information. A prognostic rule may include a rule associated with predicting a future part failure of a part of an aircraft.

As shown in FIG. 1B, and by reference number 140, aircraft device N, associated with aircraft N (e.g., an aircraft not included in aircraft 1 through aircraft N-1), may receive operational information associated with aircraft N during operation of aircraft N. As shown by reference number 145, aircraft device N may provide the aircraft N operational information to the prognostic platform.

As shown by reference number 150, the prognostic platform may also receive, from the maintenance device, maintenance information associated with aircraft N. As shown by reference number 155, the prognostic platform may also receive, from the environmental device, environmental information associated with aircraft N and/or the operation of aircraft N. Notably, while example implementation 100 is described in the context of generating a prediction for future part failure of aircraft N, in some implementations, a prediction for a future part failure may be generated for any of aircraft 1 to aircraft N-1 using the prognostic rules.

As shown by reference number 160, the prognostic platform may access the information associated with the one or more prognostic rules, generated and stored by the prognostic platform as described above with regard to FIG. 1A. As shown by reference number 165, the prognostic platform may generate a prediction for a future part failure, associated with aircraft N, based on the one or more prognostic rules and the operational information associated with aircraft N, the maintenance information associated with aircraft N, and/or the environmental information associated with aircraft N.

As shown by reference number 170, the prognostic platform may provide information associated with the prediction of the future part failure to a user device, such as a user device associated with an owner and/or operator of aircraft N (e.g., such that a preventative or remedial action may be taken).

In this way, a prognostic platform may generate one or more prognostic rules and may generate a prediction associated with a future part failure of an aircraft using the one or more prognostic rules. This may allow the future part failure to be prevented and/or remedied before occurrence, thereby improving reliability, safety, usage, or the like of the aircraft.

Moreover, human resources, computing resources of the user device, and/or network resources consumed by the user device may be conserved since the prognostic platform may allow the owner and/or operator of the aircraft to quickly and/or readily identify a potential future part failure, thus requiring fewer man-hours and/or fewer computing resources and/or less network consumption by the user device.

As indicated above, FIGS. 1A and 1B are provided merely as an example. Other examples are possible and may differ from what was described with regard to FIGS. 1A and 1B.

Figure 2:
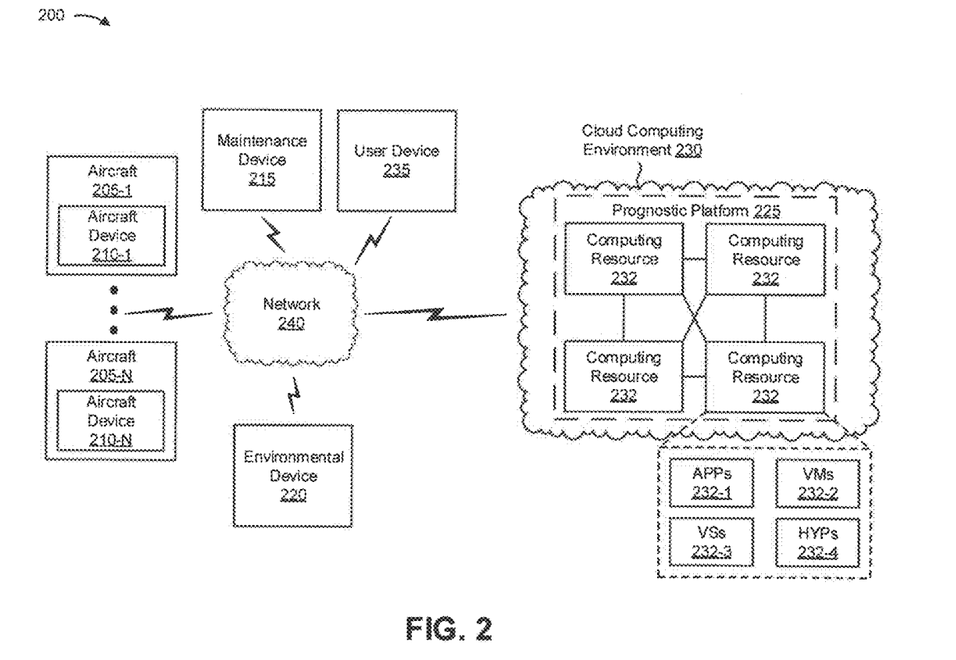
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more aircraft 205-1 through 205-N (N≥1) (hereinafter referred to collectively and individually as aircraft 205), and each aircraft 205 may include one or more corresponding aircraft devices 210-1 through 210-N (hereinafter referred to collectively as aircraft devices 210 and individually as aircraft device 210). As further shown, environment 200 may include a maintenance device 215, an environmental device 220, a prognostic platform 225 hosted in a cloud computing environment 230, a user device 235, and a network 240. Devices of environment 200 may interconnect via wired connections, wireless connections, or a combination of wired and wireless connections.

Aircraft 205 includes a vehicle capable of flight. For example, aircraft 205 may include an aircraft, such as a jet, a propeller driven airplane, a helicopter, a glider, an unmanned aerial vehicle (UAV), a spacecraft, a satellite, or the like. In some implementations, aircraft 205 may include one or more aircraft devices 210.

Aircraft device 210 includes one or more devices capable of sensing, collecting, receiving, determining, processing, storing, and/or providing operational information associated operation of aircraft 205. For example, aircraft device 210 may include a device capable of sensing, collecting, measuring, receiving, or otherwise determining operational information associated with aircraft 205, such as an acoustic sensor, a vibration sensor, a temperature sensor, a pressure sensor, a navigational sensor and/or instrument, a speed sensor, a current sensor, a voltage detector, a flow meter, a position sensor, an accelerometer, a strain gauge, a torque sensor, a viscometer, or the like. In some implementations, aircraft device 210 may include any type of device that may be installed on and/or in aircraft 205 and that is capable of determining operational information associated with aircraft 205 and/or one or more systems of aircraft 205.

In some implementations, aircraft device 210 may be capable of providing the operational information. For example, aircraft device 210 may include a communication device that allows aircraft device 210 to communicate with another aircraft device 210, maintenance device 215, environmental device 220, prognostic platform 225, user device 235, or the like, via a wired and/or a wireless connection (e.g., via a WiFi connection, a Bluetooth connection, a cellular network connection, an Ethernet connection, etc.).

Maintenance device 215 includes a device capable of receiving, determining, processing, storing, and/or providing maintenance information associated with aircraft 205. For example, maintenance device 215 may include a server or a group of servers. In some implementations, maintenance device 215 may be capable of sending information to and/or receiving information from another device of environment 200, such as prognostic platform 225.

Environmental device 220 includes a device capable of receiving, determining, processing, storing, and/or providing environmental information associated with aircraft 205 and/or operation of aircraft 205. For example, environmental device 220 may include a server or a group of servers. In some implementations, environmental device 220 may be capable of sending information to and/or receiving information from another device of environment 200, such as prognostic platform 225.

Prognostic platform 225 includes one or more devices capable of creating, identifying, generating, storing and/or using one or more prognostic rules associated with predicting part failure associated with aircraft 205. For example, prognostic platform 225 may include a server or a group of servers. In some implementations, prognostic platform 225 may be capable of receiving operational information, maintenance information, and/or environmental information associated with aircraft 205 and/or operation of aircraft 205, and generating, based on the one or more prognostic rules, a part failure prediction associated with aircraft 205. Additionally, or alternatively, prognostic platform 225 may be capable of providing information associated with the part failure prediction to another device, such as user device 235 (e.g., such that a remedial and/or preventative action may be taken).

In some implementations, as shown, prognostic platform 225 may be hosted in cloud computing environment 230. Notably, while implementations described herein describe prognostic platform 225 as being hosted in cloud computing environment 230, in some implementations, prognostic platform 225 may not be cloud-based (i.e., may be implemented outside of a cloud computing environment) or may be partially cloud-based.

Cloud computing environment 230 may include an environment that hosts prognostic platform 225. Cloud computing environment 230 may provide computation, software, data access, storage, etc. services that do not require end-user (e.g., user device 235) knowledge of a physical location and configuration of system(s) and/or device(s) that hosts prognostic platform 225. As shown, cloud computing environment 230 may include a group of computing resources 232 (referred to collectively as computing resources 232 and individually as "computing resource 232").

Computing resource 232 includes one or more personal computers, workstation computers, server devices, or another type of computation and/or communication device. In some implementations, computing resource 232 may host prognostic platform 225. The cloud resources may include compute instances executing in computing resource 232, storage devices provided in computing resource 232, data transfer devices provided by computing resource 232, etc. In some implementations, computing resource 232 may communicate with other computing resources 232 via wired connections, wireless connections, or a combination of wired and wireless connections.

As further shown in FIG. 2, computing resource 232 may include a group of cloud resources, such as one or more applications ("APPs") 232-1, one or more virtual machines ("VMs") 232-2, virtualized storage ("VSs") 232-3, one or more hypervisors ("HYPs") 232-4, or the like.

Application 232-1 may include one or more software applications that may be provided to or accessed by user device 235. Application 232-1 may eliminate a need to install and execute the software applications on user device 235. For example, application 232-1 may include software associated with prognostic platform 225 and/or any other software capable of being provided via cloud computing environment 230. In some implementations, one application 232-1 may send/receive information to/from one or more other applications 232-1, via virtual machine 232-2.

Virtual machine 232-2 may include a software implementation of a machine (e.g., a computer) that executes programs like a physical machine. Virtual machine 232-2 may be either a system virtual machine or a process virtual machine, depending upon use and degree of correspondence to any real machine by virtual machine 232-2. A system virtual machine may provide a complete system platform that supports execution of a complete operating system ("OS"). A process virtual machine may execute a single program, and may support a single process. In some implementations, virtual machine 232-2 may execute on behalf of a user (e.g., user device 235), and may manage infrastructure of cloud computing environment 230, such as data management, synchronization, or long-duration data transfers.

Virtualized storage 232-3 may include one or more storage systems and/or one or more devices that use virtualization techniques within the storage systems or devices of computing resource 232. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 232-4 may provide hardware virtualization techniques that allow multiple operating systems (e.g., "guest operating systems") to execute concurrently on a host computer, such as computing resource 232. Hypervisor 232-4 may present a virtual operating platform to the guest operating systems, and may manage the execution of the guest operating systems. Multiple instances of a variety of operating systems may share virtualized hardware resources.

User device 235 includes a device capable of receiving, storing, processing, and/or providing information associated with a part failure prediction associated with aircraft 205. For example, user device 235 may include a communication and computing device, such as a mobile phone (e.g., a smart phone, a radiotelephone, etc.), a laptop computer, a tablet computer, a handheld computer, a desktop computer, a server, a group of servers, a wearable communication device (e.g., a smart wristwatch, a pair of smart eyeglasses, etc.), or a similar type of device.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
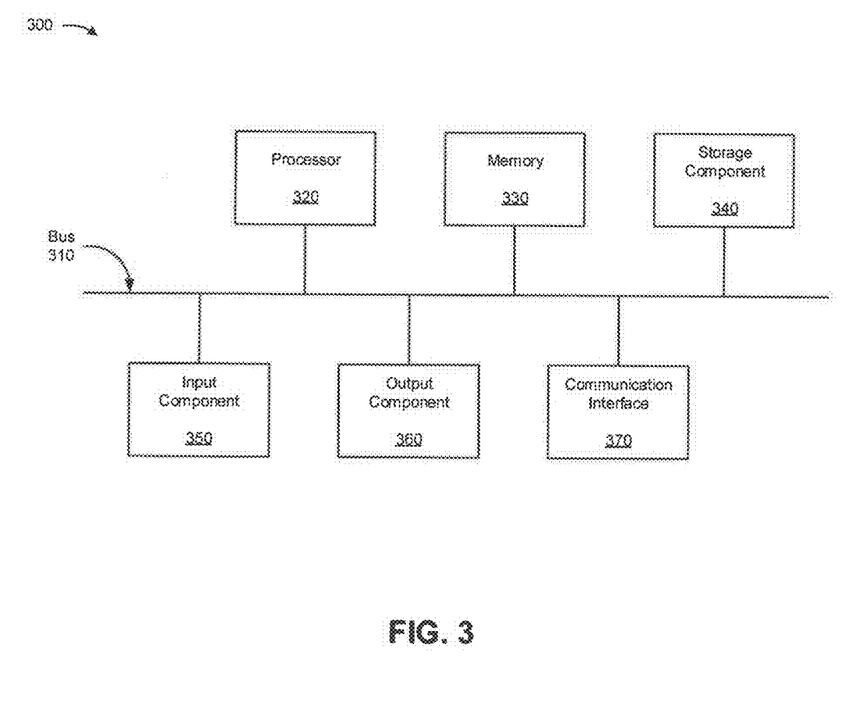
FIG. 3 is a diagram of example components of one or more devices of FIG. 2.

FIG. 3 is a diagram of example components of a device 300. Device 300 may correspond to aircraft device 210, maintenance device 215, environmental device 220, prognostic platform 225, and/or user device 235. In some implementations, aircraft device 210, maintenance device 215, environmental device 220, prognostic platform 225, and/or user device 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
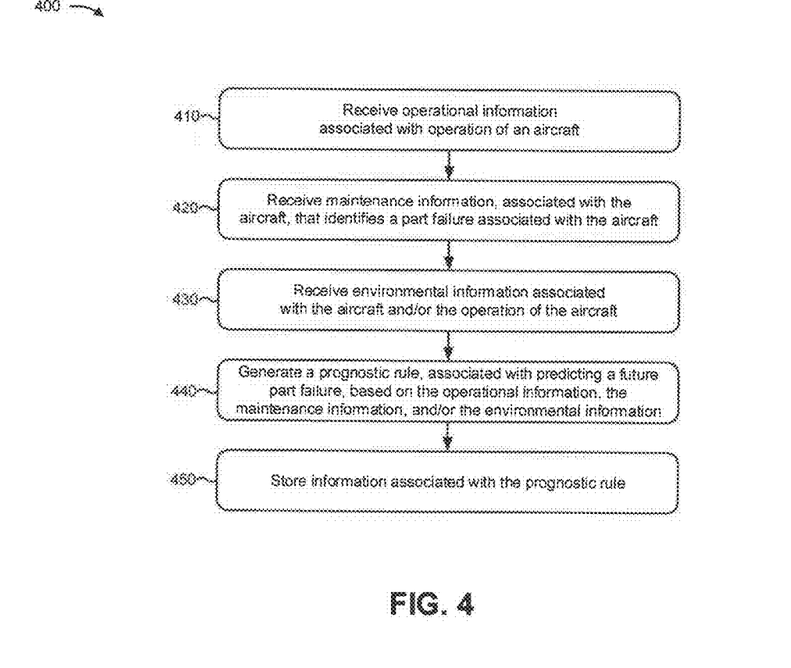
FIG. 4 is a flow chart of an example process for generating a prognostic rule for predicting a future part failure associated with an aircraft.

FIG. 4 is a flow chart of an example process 400 for generating a prognostic rule for predicting a future part failure associated with an aircraft. In some implementations, one or more process blocks of FIG. 4 may be performed by prognostic platform 225. In some implementations, one or more process blocks of FIG. 4 may be performed by another device or a group of devices separate from or including prognostic platform 225, such as another device of environment 200.

As shown in FIG. 4, process 400 may include receiving operational information associated with operation of an aircraft (block 410). For example, prognostic platform 225 may receive operational information associated with operation of aircraft 205. In some implementations, prognostic platform 225 may receive the operational information when another device provides the operational information, such as when aircraft device 210 provides the operational information.

The operational information may include information associated with operation of aircraft 205 (e.g., during flight, during landing, during takeoff, during taxiing). For example, the operational information may include one or more types of data, associated with one or more parts and/or systems (herein collectively referred to as parts and individually as a part) of aircraft 205, that is sensed, collected, measured, received, or otherwise determined during operation by, for example, one or more aircraft devices 210 of aircraft 205.

As a particular example, the operational information may include quick access recorder (QAR) data collected by one or more aircraft devices 210 of aircraft 205. In some implementations, the QAR data may include raw data, corresponding to multiple (e.g., hundreds, thousands) parameters associated with parts of aircraft 205, that is collected and/or received by one or more aircraft devices 210. As another example, the operational information may include engine monitoring unit (EMU) data collected by one or more aircraft devices 210 of aircraft 205. In some implementations, the EMU data may include data corresponding to parameters associated with an engine of aircraft 205.

In some implementations, prognostic platform 225 may identify an anomaly based on the operational information. An anomaly may include an event, indicated by one or more items of information included in the operational information, that is atypical, abnormal, unexpected, significant, or the like. For example, an anomaly may include an occurrence of a value of a parameter satisfying a threshold value (e.g., being less than or equal the threshold value, greater than or equal to the threshold value) during operation of aircraft 205. As another example, an anomaly may include an occurrence of a value of a parameter changing by a threshold amount (e.g., a sudden or gradual increase or decrease) during operation. As yet another example, an anomaly may include an occurrence of a difference between a value of a first parameter and a value of a second parameter satisfying a threshold value during operation of aircraft 205. As still another example, an anomaly may include an occurrence of a value of a parameter being within a range of values (e.g., one time, for a particular amount of time, during a particular time window) during operation of aircraft 205. As yet another example, an anomaly may include an occurrence of a trend, a pattern, or the like, associated with a parameter, detected by prognostic platform 225 (e.g., using a trend detection algorithm, a pattern detection algorithm). In some implementations, the anomaly may be associated with one or more parameters. In some implementations, the anomaly may be associated with a single operation of aircraft 205. Additionally, or alternatively, the anomaly may be associated with multiple operations of aircraft 205.

Additionally, or alternatively, prognostic platform 225 may associate temporal information with the anomaly. For example, prognostic platform 225 may identify, based on the operational information, a time (e.g., a time of day, a date) at which the anomaly occurred, and may associate the temporal information with the anomaly. As another example, prognostic platform 225 may identify times associated with multiple items of operational information that contribute the anomaly (e.g., timestamps associated with items of operational information based on which the anomaly was identified), and may associate the temporal information with the anomaly.

In some implementations, prognostic platform 225 may identify the anomaly based on one or more items of operational information. For example, prognostic platform 225 may determine information associated with identifying one or more anomalies (i.e., a set of anomaly rules, a set of anomaly detection algorithms, information that defines a set of anomalies), and may identify one or more anomalies based on the operational information and the information associated with identifying the one or more anomalies.

In some implementations, prognostic platform 225 may generate an anomaly score corresponding to the anomaly. The anomaly score may identify a severity of the anomaly (e.g., high, medium, low, a numerical value from zero to one). In some implementations, prognostic platform 225 may determine the severity of the anomaly based on the operational information corresponding to the anomaly and the information associated with identifying the anomaly.

Additionally, or alternatively, prognostic platform 225 may determine the anomaly score in another manner, such as based a set of anomaly score rules associated with generating the score, an anomaly score algorithm.

Additionally, or alternatively, the operational information may include information associated with a message that is generated during operation of aircraft 205 and relates to the operation of aircraft 205 (herein referred to as message information). The message may include a warning, a notification, an indication, or the like, generated during operation of aircraft 205. For example, the message may be generated by a software module, associated with one or more parts of aircraft 205, in order to cause a message to be provided during operation (e.g., by causing a warning light to be illuminated, by displaying a message on a display screen). As a particular example, the message information may include post flight report (PFR) data, collected by one or more aircraft devices 210 of aircraft 205, associated with messages generated during operation. In some implementations, the message information may correspond to one or more items of QAR data and/or EMU data. Additionally, or alternatively, the message information may correspond to one or more other items of information (i.e., information that is not included in the QAR data or the EMU data).

Additionally, or alternatively, the operational information may include another type of information associated with aircraft 205 and/or operation of aircraft 205, such as an aircraft identifier (e.g., an aircraft identification number, a tail number), a operation identifier (e.g., a flight identification number, flight path and/or flight route information), information that identifies an owner and/or operator of aircraft 205, or the like.

In some implementations, prognostic platform 225 may receive the operational information from one or more aircraft devices 210 of aircraft 205. For example, prognostic platform 225 may receive (e.g., automatically, based on user input) the operational information from the one or more aircraft devices 210 when aircraft 205 lands at a destination associated with the operation, such as when the one or more aircraft devices 210 connect to network 240 (e.g., a WiFi network) associated with the destination. Additionally, or alternatively, prognostic platform 225 may receive the operational information during operation (e.g., in real-time or near real-time) via network 240 (e.g., a satellite network).

In some implementations, prognostic platform 225 may receive operational information associated with multiple aircraft 205 and/or multiple operations of the multiple aircraft 205. This may allow prognostic platform 225 to generate a better prognostic rule, associated with predicting a future failure of an aircraft part, than may be generated using operation information from a single aircraft. In some implementations, prognostic platform 225 may store information associated with the operational information, such as the operation identifier and/or the aircraft identifier corresponding to the operation of aircraft 205 and aircraft 205, respectively.

As further shown in FIG. 4, process 400 may include receiving maintenance information, associated with the aircraft, that identifies a part failure associated with the aircraft (block 420). For example, prognostic platform 225 may receive maintenance information, associated with aircraft 205, that identifies a failure, a fault, an error, or the like, associated with a part and/or a system of aircraft 205 (herein referred to as a part failure). In some implementations, prognostic platform 225 may receive the maintenance information when another device provides the maintenance information, such as when maintenance device 215 provides the maintenance information.

The maintenance information may include information associated with maintenance, repair, upkeep, or the like, of aircraft 205. For example, the maintenance information may include maintenance, repair, and overhaul (MRO) data associated with aircraft 205 and/or one or more parts of aircraft 205. In some implementations, the maintenance information may include information associated with the part failure, such as information that identifies the part (e.g., a part identification number, a part name, a serial number, a part manufacturer, a part brand), information that identifies the failure of the part (e.g., a type of part failure, a part failure identifier), a date associated with the part failure (e.g., a date the part failure was identified, a date the part failure was remedied), a manner in which the part failure was remedied (e.g., repaired, replaced, reconfigured), or the like.

Additionally, or alternatively, the maintenance information may include other information associated with maintaining and/or repairing aircraft 205. For example, the maintenance information may include information associated with routine maintenance, preventative maintenance, and/or an inspection performed on aircraft 205.

Additionally, or alternatively, the maintenance information may include another type of information associated with aircraft 205, such as the aircraft identifier, an operation identifier associated with the part failure, an operation identifier associated with maintenance or inspection of aircraft 205, or the like. In some implementations, prognostic platform 225 may receive the maintenance information from maintenance device 215.

In some implementations, prognostic platform 225 may receive maintenance information associated with multiple aircraft 205. This may allow prognostic platform 225 to generate a better prognostic rule, associated with predicting a future failure of an aircraft part, than may be generated using maintenance information for a single aircraft. In some implementations, prognostic platform 225 may store information associated with the maintenance information, such as the aircraft identifier corresponding to aircraft 205 (e.g., such that prognostic platform 225 may determine maintenance information, associated with aircraft 205, at a later time).

As further shown in FIG. 4, process 400 may include receiving environmental information associated with the aircraft and/or the operation of the aircraft (block 430). For example, prognostic platform 225 may receive environmental information associated with aircraft 205 and/or the operation of aircraft 205. In some implementations, prognostic platform 225 may receive the environmental information when another device provides the environmental information, such as when environmental device 220 provides the environmental information.

The environmental information may include information associated with an environment in which aircraft 205 flies, operates, is based, or the like. For example, the environmental information may include weather data associated with the operation of aircraft 205 (e.g., information that identifies one or more weather conditions associated with the operation). As another example, the environmental information may include route data and/or flight path data associated with the operation. As yet another example, the environmental information may include information associated with a departure or arrival location associated with the operation, such as information that identifies the departure location or the arrival location, departure or arrival weather data, departure or arrival climate information (e.g., general climate conditions of the departure or arrival location, such as dusty, windy, hot, cold, icy, rainy), or the like.

Additionally, or alternatively, the environmental information may include another type of information associated with aircraft 205, such as the aircraft identifier corresponding to the environmental information, the operation identifier corresponding to the environmental information, or the like. In some implementations, prognostic platform 225 may receive the environmental information from environmental device 220.

In some implementations, prognostic platform 225 may receive environmental information associated with multiple aircraft 205 and/or multiple operations of the multiple aircraft 205. This may allow prognostic platform 225 to generate a prognostic rule, associated with predicting a future failure of an aircraft part, than may be generated using environmental information associated with a single aircraft and/or a single operation.

In some implementations, prognostic platform 225 may store information associated with the environmental information, such as the aircraft identifier corresponding to aircraft 205, the operation identifier corresponding to the operation, or the like (e.g., such that prognostic platform 225 may determine environmental information, associated with aircraft 205 and/or the operation, at a later time).

As further shown in FIG. 4, process 400 may include generating a prognostic rule, associated with predicting a future part failure, based on the operational information, the maintenance information, and/or the environmental information (block 440). For example, prognostic platform 225 may generate a prognostic rule, associated with predicting a future part failure, based on the operational information, the maintenance information, and the environmental information (sometimes referred to collectively as aircraft information). In some implementations, prognostic platform 225 may generate (e.g., automatically) the prognostic rule after prognostic platform 225 receives the operational information, the maintenance information, and/or the environmental information.

The prognostic rule may include a rule associated with predicting a future part failure of a part of aircraft 205. For example, the prognostic rule may include information that identifies any combination of one or more items of operational information, one or more items of environmental information, one or more other items of maintenance information, and/or one or more part failures, the presence of which indicates that a part failure may occur.

In some implementations, prognostic platform 225 may generate the prognostic rule based on identifying an association between one or more items of operational information, one or more items of maintenance information, and/or one or more items of environmental information and a part failure identified in the maintenance information. In some implementations, prognostic platform 225 may identify the association using an association detection algorithm that implements an association detection technique, such as a market basket analysis technique, an association rules technique, a collaborative filtering technique, or the like.

For example, assume that prognostic platform 225 stores or has access to an association detection algorithm designed to implement a market basket analysis technique associated with operations of multiple aircraft 205, and that prognostic platform 225 receives operational information, maintenance information, and environmental information, associated with multiple aircraft 205 and multiple operations of the multiple aircraft 205, in the manner described above. Here, the association detection algorithm may cause prognostic platform 225 to create a "basket" (e.g., an entry in a database), corresponding to an operation of a particular aircraft 205, based on an operation identifier and/or an aircraft identifier associated with the operation and the particular aircraft 205.

Next, prognostic platform 225 may add one or more items of operational information, associated with the operation, to the basket, such as information that identifies one or more anomalies identified based on operational information collected during operation, information associated with one or more messages generated during operation, or the like. In some implementations, prognostic platform 225 may add one or more items of environmental information, associated with the operation, to the basket. Prognostic platform 225 may repeat these steps for each operation of the particular aircraft 205 for which prognostic platform 225 has received operational information and environmental information.

Continuing with this example, prognostic platform 225 may then identify a part failure associated with the particular aircraft 205. Here, based on information associated with the part failure, prognostic platform 225 may add an indication of the part failure to one or more baskets corresponding to one or more operations of the particular aircraft 205. For example, prognostic platform 225 may add an indication that the part failure occurred within a next number of operations (e.g., 100 flights) of the particular aircraft 205 to baskets corresponding to the number of operations preceding the part failure (e.g., 100 flights immediately preceding the identification and/or remedy of the part failure). As another example, prognostic platform 225 may add an indication that the part failure occurred within a next number of operation hours (e.g., 500 hours) of the particular aircraft 205 to baskets corresponding to the number of operation hours preceding the part failure (e.g., baskets corresponding to operations that cover 500 operation hours immediately preceding the identification and/or remedy of the part failure).

Additionally, or alternatively, prognostic platform 225 may add one or more other items of maintenance information, associated with the particular aircraft 205, to baskets associated with the particular aircraft 205, such as information associated with routine maintenance, preventative maintenance, inspections, degraded or damaged parts, information associated with another part failure, or the like.

In some implementations, prognostic platform 225 may repeat these steps for multiple aircraft 205 for which prognostic platform 225 has received operational information, environmental information, and maintenance information. In this way, prognostic platform 225 may store or have access to multiple baskets corresponding to multiple operations of multiple aircraft 205, where each basket may include operational information, maintenance information, and/or environmental information associated with a corresponding operation and aircraft 205.

Next, prognostic platform 225 may analyze the baskets in order and identify associations, patterns, trends, or the like, associated with one or more part failures.

In some implementations, prognostic platform 225 may generate the prognostic rule based on multiple items of operational information, environmental information, and/or maintenance information. In some implementations, prognostic platform 225 may generate multiple prognostic rules based on analyzing the baskets. In some implementations, prognostic platform 225 may determine a metric associated with the prognostic rule, such as a confidence metric, a lift metric, a support metric, or the like.

In some implementations, prognostic platform 225 may filter one or more prognostic rules generated by prognostic platform 225 by, for example, comparing one or more metrics, associated with each prognostic rule, to one or more metric thresholds. In this example, if the one or more metrics do not satisfy the one or more metric thresholds, then prognostic platform 225 may filter the prognostic rule (e.g., such that the prognostic rule may not be used to predict a future part failure). Conversely, if the one or more metrics satisfy the one or more metric thresholds, then prognostic platform 225 may not filter the prognostic rule (e.g., such that the prognostic rule may be used to predict a future part failure).

As further shown in FIG. 4, process 400 may include storing information associated with the prognostic rule (block 450). For example, prognostic platform 225 may store information associated with the prognostic rule. In some implementations, prognostic platform 225 may store the information associated with prognostic rule such that prognostic platform 225 may access the information associated with the prognostic rule at a later time (e.g., for use in predicting a future part failure).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
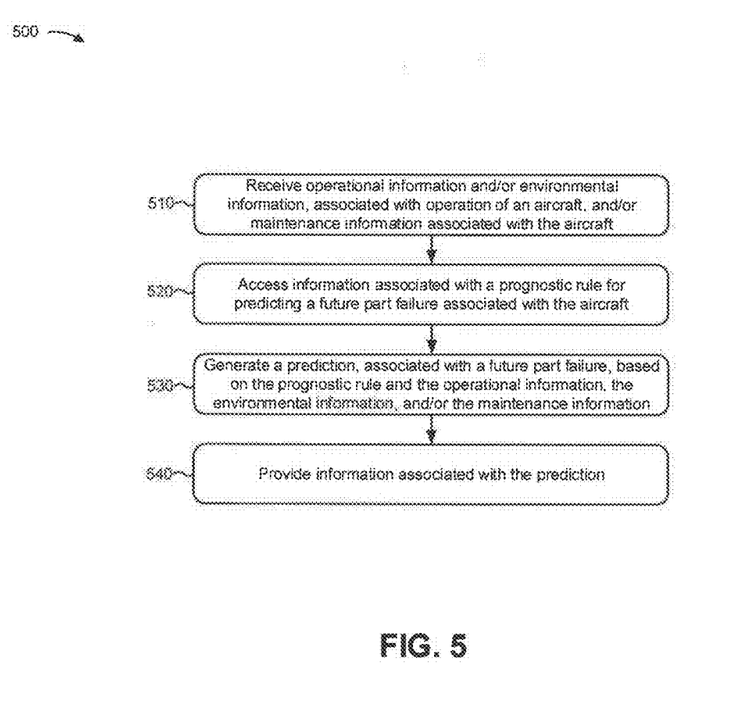
FIG. 5 is a flow chart of an example process for generating a prediction, associated with a future part failure associated with an aircraft, based on a prognostic rule.

FIG. 5 is a flow chart of an example process 500 for generating a prediction for a future part failure, associated with an aircraft, based on a prognostic rule. In some implementations, one or more process blocks of FIG. 5 may be performed by prognostic platform 225. In some implementations, one or more process blocks of FIG. 5 may be performed by another device or a group of devices separate from or including prognostic platform 225, such as another device of environment 200.

As shown in FIG. 5, process 500 may include receiving operational information and/or environmental information, associated with operation of an aircraft, and/or maintenance information associated with the aircraft (block 510). For example, prognostic platform 225 may receive operational information and/or environmental information, associated with operation of aircraft 205, and/or maintenance information associated with aircraft 205.

In some implementations, prognostic platform 225 may receive the operational information, the environmental information, and/or the maintenance information in the manner described above with regard to FIG. 4. In some implementations, the operational information, the environmental information, and the maintenance information may include information similar to the operational information, the environmental information, and the maintenance information described above with regard to FIG. 4.

As further shown in FIG. 5, process 500 may include accessing information associated with a prognostic rule for predicting a future part failure associated with the aircraft (block 520). For example, prognostic platform 225 may access information associated with a prognostic rule for predicting a future part failure associated with aircraft 205.

In some implementations, prognostic platform 225 may access the information associated with the prognostic rule based on storing the information associated with the prognostic rule, as described above with regard to FIG. 4. In some implementations, prognostic platform 225 may access information associated with multiple prognostic rules (e.g., such that prognostic platform 225 may make multiple predictions corresponding to multiple part failures).

As further shown in FIG. 5, process 500 may include generating a prediction, associated with a future part failure, based on the prognostic rule and the operational information, the environmental information, and/or the maintenance information (block 530). For example, prognostic platform 225 may generate a prediction, associated with a future part failure of a part of aircraft 205, based on the prognostic rule and the operational information, the environmental information, and/or the maintenance information.

In some implementations, prognostic platform 225 may generate the prediction based on comparing the operational information, the environmental information, and/or the maintenance information to the information associated with the prognostic rule. For example, the information associated with the prognostic rule may identify one or more particular items of operational information, environmental information, and/or maintenance information that are associated with a particular part failure. Here, prognostic platform 225 may determine whether the operational information, the environmental information, and/or the maintenance information include the one or more particular items of information. If the operational information, the environmental information, and/or the maintenance information include the one or more particular items of information, then prognostic platform 225 may generate a prediction that a future part failure, corresponding to the prognostic rule, will occur. Conversely, if the operational information, the environmental information, and/or the maintenance information do not include each of the one or more particular items, then prognostic platform 225 may generate a prediction that a future part failure will not occur.

As another example, prognostic platform 225 may generate the prediction based on how closely corresponding items of the operational information, the maintenance information, and/or the environmental information matches the items identified by the prognostic rule as being associated with the part failure. Here, prognostic platform 225 may generate a prediction that indicates a likelihood that the part, associated with the prognostic rule, will fail, based on how closely the operational information, the maintenance information, and/or the environmental information matches the items identified by the prognostic rule. In some implementations, prognostic platform 225 may filter the prediction based on a threshold.

Additionally, or alternatively, the items of information identified by the prognostic rule may include a range of values and/or a threshold value. Here, prognostic platform 225 may generate a prediction based on where corresponding items of the operational information, the maintenance information, and/or the environmental information fall in the range of values, whether the corresponding items satisfy the threshold, or the like. In such a case, information associated with each item of information may be combined in order to form the prediction.

In some implementations, prognostic platform 225 may determine additional information associated with the prediction, such as a confidence metric associated with the prediction, a support metric associated with the prediction, a lift metric associated with the prediction, a time window during which a future part failure may occur (e.g., in a case where prognostic platform 225 predicts a future part failure), or the like.

In some implementations, prognostic platform 225 may update the information associated with the prognostic rule based on the operational information, the environmental information, and/or the maintenance information. For example, prognostic platform 225 may update and/or create one or more baskets based on the operational information, the environmental information, and/or the maintenance information. Here, prognostic platform 225 may update information associated with one or more existing prognostic rules and/or create one or more new prognostic rules, based on the updated and/or created baskets, in the manner described above with regard to FIG. 4.

As further shown in FIG. 5, process 500 may include providing information associated with the prediction (block 540). For example, prognostic platform 225 may provide information associated with the prediction. In some implementations, prognostic platform 225 may provide the information associated with the prediction in order to inform an owner and/or operator of the aircraft 205 of a predicted future part failure (e.g., in order to cause a remedial and/or preventative action to be taken).

Additionally, or alternatively, prognostic platform 225 may provide the information associated with the prediction in order to cause an action to be automatically performed, such as creation and/or assignment of a work order, scheduling an inspection and/or a repair of the part, in order to automatically cause aircraft 205 to be taken out of service, in order to automatically cause a software module, associated with the part, to be updated, in order to cause an order for a new part to be placed, or the like, thereby reducing a safety risk and/or allowing an amount of time that aircraft 205 is out of service to be reduced.

As another example, prognostic platform 225 may provide the information associated with the prediction in order to automatically create a timer to count down to the predicted part failure occurrence and/or automatically send one or more reminders of the impending part failure. This may also decrease a safety risk by reducing a chance that aircraft 205 operations with an imminent part failure.

As still another example, prognostic platform 225 may provide the information associated with the prediction in order to automatically cause an active step to be taken on aircraft 205 when the part failure is imminent (e.g., maintenance personnel must push a button or input a command to override a shutdown of the aircraft when, for example, the maintenance personnel has inspected the part and certified aircraft 205 for flight). As another example, prognostic platform 225 may provide the information associated with the prediction in order to automatically schedule more frequent inspections as a predicted date of the part failure approaches. As yet another example, prognostic platform 225 may provide the information associated with the prediction in order to automatically cause an inspection of another part.

As still another example, prognostic platform 225 may provide the information associated with the prediction to a device associated with a designer and/or a manufacturer of the part associated with the future part failure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may provide a prognostic platform capable of generating one or more prognostic rules and predict a future part failure based on the one or more prognostic rules.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The invention claimed is:

1. A method, comprising: receiving, by one or more devices, first equipment information associated with first equipment, wherein receiving the first equipment information comprises obtaining the first equipment information from a device onboard the first equipment, the first equipment information including information associated with first anomalies identified based on first operational information collected during operation of the first equipment, and the first equipment information including information associated with first messages, associated with the operation of the first equipment, that are generated during the operation of the first equipment; receiving, by the one or more devices, first maintenance information from a maintenance device separate from the device onboard the first equipment, associated with the first equipment, that identifies one or more part failures associated with one or more equipment parts; identifying, by the one or more devices, a first set of associations between the one or more part failures and the first equipment information; receiving, by the one or more devices, second equipment information associated with second equipment, the second equipment information including information associated with second anomalies identified based on second operational information collected during operation of the second equipment, and the second equipment information including information associated with second messages, associated with the operation of the second equipment, that are generated during the operation of the second equipment; generating, by the one or more devices and based on the second equipment information and the first set of associations, a prediction associated with a future failure of a part of the second equipment; and providing, by the one or more devices, information associated with the prediction.

2. The method of claim 1, where identifying the first set of associations between the one or more part failures and the first equipment information comprises: analyzing the first equipment information and the first maintenance information using at least one of: a market basket analysis technique, an association rules technique, or a collaborative filtering technique; and identifying the first set of associations based on a result of analyzing the first equipment information and the first maintenance information.

3. The method of either of claim 1, further comprising: obtaining the first operational information, collected during the operation of the first equipment, from a device onboard the first equipment, the first operational information including quick access recorder data collected during the operation of the first equipment; and identifying the first anomalies based on the quick access recorder data.

4. The method of claim 1, further comprising: obtaining the first operational information, collected during the operation of the first equipment, from a device onboard the first equipment, the first operational information including engine monitoring unit data collected during the operation of the first equipment; and identifying the first anomalies based on the engine monitoring unit data.

5. The method of claim 1, where receiving the first equipment information comprises: obtaining the information associated with the first messages, associated with the operation of the first equipment, from a device onboard the first equipment, the first messages being included in post flight report data collected during the operation of the first equipment.

6. The method of claim 1, where the first maintenance information is associated with maintenance, repair, and overhaul data collected during maintenance or inspection of the first equipment, and where identifying the first set of associations between the one or more part failures and the first equipment information comprises: identifying the first set of associations further based on the maintenance information received from the maintenance device.

7. The method of claim 1, further comprising: receiving environmental information associated with the first equipment or an operation of the first equipment from the environmental device separate from the maintenance device and the device onboard the first equipment; and where identifying the first set of associations between the one or more part failures and the first equipment information comprises: identifying the first set of associations further based on the environmental information received from the environmental device associated with the first equipment or the operation of the first equipment.

8. The method of claim 1, wherein providing information associated with the prediction comprises communicating the information associated with the prediction to at least one of an aircraft device, a prognostic platform, or a user device.

9. A device, comprising: one or more processors to: receive first equipment information associated with one or more first items of equipment, the first equipment information including information associated with anomalies identified based on operational information collected during operation of the one or more first items of equipment, and the first equipment information including information associated with messages, associated with the operation of the one or more first items of equipment, that are generated during the operation of the one or more first items of equipment; receive maintenance information, associated with the one or more first items of equipment, that identifies one or more part failures of one or more equipment parts of the one or more first items of equipment, where the maintenance information is associated with maintenance, repair, and overhaul data collected during maintenance or inspection of the first equipment; identify a first set of associations between the one or more part failures and the first equipment information based at least in part on the maintenance information and the first equipment information; and store information, regarding the first set of associations between the one or more part failures and the first equipment information, to permit a prediction to be made regarding a future failure of an equipment part of a second item of equipment.

10. The device of claim 9, where the one or more processors, when identifying the first set of associations between the one or more part failures and the first equipment information, are to: identify the first set of associations based on an association detection algorithm that implements at least one of a market basket analysis technique, an association rules technique, or a collaborative filtering technique.

11. The device of claim 9, where the one or more processors are further to: obtain the operational information, collected during the operation of the one or more first items of equipment, from one or more devices onboard the one or more first items of equipment, the operational information including quick access recorder data collected during the operation of the one or more first items of equipment, or the operational information including engine monitoring unit data collected during the operation of the one or more first items of equipment; and identify the anomalies based on the quick access recorder data or the engine monitoring unit data.

12. The device of claim 9, where the one or more processors, when receiving the first equipment information, are to: obtain the information associated with the messages, associated with the operation of the one or more first items of equipment, from one or more devices onboard the one or more first items of equipment, the messages being included in post flight report data collected during the operation of the one or more first items of equipment.

13. The device of claim 9, where the one or more processors are further to: receive environmental information associated with the one or more first items of equipment or an operation of the one or more first items of equipment; and where the one or more processors, when identifying the first set of associations between the one or more part failures and the first equipment information, are to: identify the first set of associations further based on the environmental information associated with the one or more first items of equipment or the operation of the one or more first items of equipment.

14. The device of claim 9, where the maintenance information, associated with the one or more first items of equipment, further includes information associated with preventative maintenance, routine maintenance, or an inspection of the one or more first items of equipment, and where the one or more processors, when identifying the first set of associations between the one or more part failures and the first equipment information, are to: identify the first set of associations further based on the information associated with the preventative maintenance, the routine maintenance, or the inspection of the one or more first items of equipment.

15. A non-transitory computer-readable medium storing instructions, the instructions comprising: one or more instructions that, when executed by one or more processors, cause the one or more processors to: receive first equipment information associated with first equipment, the first equipment information including information associated with first anomalies identified based on first operational information collected during operation of the first equipment, and the first equipment information including information associated with first messages, associated with the operation of the first equipment, that are generated during the operation of the first equipment; access a first set of associations identified based on information associated with one or more equipment part failures and second equipment information, the one or more equipment part failures being associated with second equipment and being identified based on maintenance information associated with the second equipment, the maintenance information associated with the second equipment associated with maintenance repair, and overhaul data collected during maintenance or inspection of the second equipment, the second equipment information including information associated with second anomalies identified based on second operational information collected during operation of the second equipment, and the second equipment information including information associated with second messages, associated with the operation of the second equipment, that are generated during the operation of the second equipment; generate, based on the first equipment information and the first set of associations, a prediction associated with a future failure of an equipment part of the first equipment; and provide information associated with the prediction.

16. The non-transitory computer-readable medium of claim 15, where the one or more instructions, when executed by the one or more processors, further cause the one or more processors to: obtain the first operational information, collected during the operation of the first equipment, from a device onboard the first equipment, the first operational information including quick access recorder data collected during the operation of the first equipment; and determine the information associated with the first anomalies based on the quick access recorder data.

17. The non-transitory computer-readable medium of claim 15, where the one or more instructions, when executed by the one or more processors, further cause the one or more processors to: obtain the first operational information, collected during the operation of the first equipment, from a device onboard the first equipment, the first operational information including engine monitoring unit data collected during the operation of the first equipment; and determine the information associated with the first anomalies based on the engine monitoring unit data.

18. The non-transitory computer-readable medium of claim 15, where the one or more instructions, that cause the one or more processors to receive the first equipment information, cause the one or more processors to: obtain the information associated with the first messages, associated with the operation of the first equipment, from a device onboard the first equipment, the first messages being included in post flight report data collected during the operation of the first equipment.

19. The non-transitory computer-readable medium of claim 15, where the first equipment information further includes first maintenance information associated with the first equipment, the first maintenance information, associated with the first equipment, being associated with maintenance, repair, and overhaul data collected during maintenance or inspection of the first equipment.

20. The non-transitory computer-readable medium of claim 15, where the first equipment information further includes environmental information associated with the first equipment or an operation of the first equipment, the environmental information including weather data, climate data, or route data associated with the first equipment or the operation of the first equipment.

* * * * *